United States Patent
Zhang et al.

(10) Patent No.: US 12,158,666 B2
(45) Date of Patent: Dec. 3, 2024

(54) LIQUID CRYSTAL DISPLAY PANEL

(71) Applicant: WUHAN CHINA STAR OPTOELECTRONICS TECHNOLOGY CO., LTD., Wuhan (CN)

(72) Inventors: Guiyang Zhang, Wuhan (CN); Tengteng Shi, Wuhan (CN); Guowei Zha, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 149 days.

(21) Appl. No.: 17/281,799

(22) PCT Filed: Dec. 31, 2020

(86) PCT No.: PCT/CN2020/142285
§ 371 (c)(1),
(2) Date: Sep. 6, 2023

(87) PCT Pub. No.: WO2022/141454
PCT Pub. Date: Jul. 7, 2022

(65) Prior Publication Data
US 2023/0418111 A1    Dec. 28, 2023

(30) Foreign Application Priority Data
Dec. 29, 2020    (CN) .......................... 202011591258.5

(51) Int. Cl.
G02F 1/1339    (2006.01)
G02F 1/1333    (2006.01)
G02F 1/1335    (2006.01)

(52) U.S. Cl.
CPC .... G02F 1/13394 (2013.01); G02F 1/133377 (2013.01); G02F 1/13338 (2013.01);
(Continued)

(58) Field of Classification Search
CPC ......... G02F 1/133514; G02F 1/133512; G02F 1/136209; G02F 1/13473; G02F 1/133371;
(Continued)

(56) References Cited

U.S. PATENT DOCUMENTS

| | | | |
|---|---|---|---|
| 10,665,631 B1 * | 5/2020 | Cai | .................. H01L 27/14678 |
| 2012/0262507 A1 | 10/2012 | Ide et al. | |
| 2022/0326557 A1 * | 10/2022 | Liu | .................. G02F 1/134345 |

FOREIGN PATENT DOCUMENTS

| | | | | |
|---|---|---|---|---|
| CN | 106405946 A | * | 2/2017 | ......... G02F 1/13338 |
| CN | 109445161 A | | 3/2019 | |

(Continued)

OTHER PUBLICATIONS

International Search Report in International application No. PCT/CN2020/142285, mailed on Sep. 8, 2021.
(Continued)

*Primary Examiner* — Shan Liu
(74) *Attorney, Agent, or Firm* — PV IP PC; Wei Te Chung (57) ABSTRACT

The application discloses a liquid crystal display panel, including: a color filter substrate defined with a plurality of light path openings, a driving substrate arranged opposite to the color filter substrate, a liquid crystal layer located between the color filter substrate and the driving substrate, and a plurality of photosensitive sensor units, wherein a plurality of retaining wall structures are provided in the liquid crystal layer, the retaining wall structures are hollow, a top and a bottom of each of the retaining wall structures are
(Continued)

both open, a top opening of each of the retaining wall structures is aligned with at least one of the light path openings, and a bottom opening of each of the retaining wall structures is aligned with one of the photosensitive sensor units. The present application can improve signal-to-noise ratios of fingerprint signals through the retaining wall structures.

10 Claims, 7 Drawing Sheets

(52) U.S. Cl.
CPC .. *G02F 1/133512* (2013.01); *G02F 1/133514* (2013.01); *G02F 1/133526* (2013.01)

(58) Field of Classification Search
CPC ......... G02F 1/136222; G02F 1/136218; G02F 2001/136222; G02F 2001/136218; H01J 11/44; H01J 2211/444; H01J 2329/323; H01J 29/327
See application file for complete search history.

(56) References Cited

FOREIGN PATENT DOCUMENTS

| CN | 110161739 | A | * | 8/2019 | ......... G02F 1/13338 |
|----|-----------|---|---|--------|------------------------|
| CN | 110187546 | A |   | 8/2019 | |
| CN | 110309705 | A |   | 10/2019 | |
| CN | 110501839 | A |   | 11/2019 | |
| CN | 111708205 | A |   | 9/2020 | |
| CN | 211403022 | U | * | 9/2020 | ......... G02F 1/13338 |
| CN | 111752028 | A |   | 10/2020 | |
| CN | 111983841 | A |   | 11/2020 | |
| CN | 112018157 | A |   | 12/2020 | |

OTHER PUBLICATIONS

Written Opinion of the International Searching Authority in International application No. PCT/CN2020/142285, mailed on Sep. 8, 2021.

Chinese Office Action in corresponding Chinese Patent Applicant No. 202011591258.5 dated Dec. 23, 2021, pp. 1-10.

* cited by examiner

LIQUID CRYSTAL DISPLAY PANEL

RELATED APPLICATIONS

This application is a Notional Phase of PCT Patent Application No. PCT/CN2020/142285 having international filing date of Dec. 31, 2020, which claims the benefit of priority of Chinese Patent Application No. 202011591258.5 filed on Dec. 29, 2020. The contents of the above applications are all incorporated by reference as if fully set forth herein in their entirety.

FIELD OF INVENTION

The present disclosure relates to the field of display and in particular to a liquid crystal display panel.

BACKGROUND OF INVENTION

Optical fingerprint recognition technology does not affect display function while realizing fingerprint recognition function, because optical fingerprint recognition uses light signals to illuminate recognized targets, such as fingerprints, palm prints, 3D faces, etc., by detecting characteristic signals with different reflection intensities of identified targets to identify objects. The technology is applied to portable electronic equipment without a need of external light source. Therefore, optical fingerprint recognition technology can prevent information leakage and ensure personal privacy without affecting display, while maintaining a high screen-to-body ratio.

Optical fingerprint recognition technology combined with liquid crystal display (LCD) currently has two major technical difficulties: sensor receiving unit and light path structure. An optical signal receiving element can be developed in conjunction with low temperature poly-silicon (LTPS) technology. There have been related studies and reports, but effective light path structures are relatively rare.

Since an LCD panel needs a backlight plate to provide a light source, a fingerprint-reflected backlight will generate more interference signals in a fingerprint recognition area, which is mainly manifested as a large amount of large-angle reflected light directed at a fingerprint recognition module, and the fingerprint recognition module's fingerprint recognition accuracy is affected by "signal-to-noise ratio", wherein the signal-to-noise ratio refers to a ratio of a small-angle reflected light to a large-angle reflected light, when a large amount of large-angle reflected light is directed at the fingerprint recognition module, the signal-to-noise ratio and the fingerprint recognition accuracy will decrease, and even fingerprints cannot be recognized.

Therefore, how to design an effective light path structure in the liquid crystal display panel to improve the signal-to-noise ratio and fingerprint recognition accuracy is a challenge that LCD optical fingerprint recognition technology must overcome.

SUMMARY OF INVENTION

Technical Problems

Embodiments of the present disclosure provide a liquid crystal display panel, which can solve the problems of low signal-to-noise ratio and low fingerprint recognition accuracy caused by interference signals in the currently liquid crystal display panels, overcome the problem of light path design, can effectively filter interference signals, and improve the signal-to-noise ratio of the fingerprint signal, thereby improving the accuracy of fingerprint recognition.

Technical Solution to Technical Problem

Technical Solutions

In a first aspect, one embodiment of the present disclosure provides a liquid crystal display panel, which includes:
a color filter substrate provided with a plurality of light path openings;
a driving substrate arranged opposite to the color filter substrate;
a liquid crystal layer located between the color filter substrate and the driving substrate; and
a plurality of photosensitive sensor units formed on a surface of a side of the driving substrate close to the liquid crystal layer or formed inside the driving substrate;
wherein a plurality of retaining wall structures are provided in the liquid crystal layer, the retaining wall structures are hollow, a top and a bottom of each of the retaining wall structures are both opened, a top opening of each of the retaining wall structure is aligned with at least one of the light path openings, and a bottom opening of each of the retaining wall structures is aligned with one of the photosensitive sensor units; and
wherein a material of the retaining wall structures is a black light-absorbing material, wherein hollow portions of the retaining wall structures are filled with a transparent material, and a height of the retaining wall structures is equal to a thickness of the liquid crystal layer.

Optionally, in some embodiments of the present disclosure, the transparent material is an optically clear adhesive.

Optionally, in some embodiments of the present disclosure, the transparent material possesses selective absorptivity.

Optionally, in some embodiments of the present disclosure, the transparent material has selective absorption in the visible light waveband.

Optionally, in some embodiments of the present disclosure, the transparent material possesses a character filtering out red light.

Optionally, in some embodiments of the present disclosure, the color filter substrate comprises a transparent substrate, a filter layer, and a black matrix layer, the filter layer comprises a plurality of color filter units and are located on a side of the transparent substrate close to the liquid crystal layer, the black matrix layer is arranged between any two adjacent color filter units, and the plurality of light path openings are located on the black matrix layer.

Optionally, in some embodiments of the present disclosure, the color filter substrate further comprises light-shielding layers, and each of the light-shielding layers is provided with a plurality of first light-transmitting regions and a plurality of second light-transmitting regions, wherein each of the first light-transmitting regions on each of the light-shielding layers corresponds to a position of one or more adjacent color filter units, and projections in a vertical direction of the one or more adjacent color filter units and the first light-transmitting region corresponding to the one or more adjacent color filter units are at least partially overlapped, wherein the plurality of second light-transmitting regions on each of the light-shielding layers corresponds to positions of the plurality of light path openings in a one-to-one manner, and projections in the vertical direction of each of the light path openings, the second light-transmitting region corresponding to each of the light path openings, and the top opening of the retaining wall structure corresponding to each of the light path openings are at least partially overlapped.

Optionally, in some embodiments of the present disclosure, the color filter substrate further comprises a plurality of optical micro-lenses, the plurality of optical micro-lenses are located on a side of the transparent substrate close to the black matrix layer, and positions of the plurality of optical micro-lenses correspond to the plurality of light path openings in a one-to-one manner.

Optionally, in some embodiments of the present disclosure, at least one planarization layer is filled between the plurality of optical micro-lenses and the liquid crystal layer, and refractive indexes of the planarization layer and the optical micro-lens are not equal.

Optionally, in some embodiments of the present disclosure, light-shielding layers are provided between the optical micro-lens and the liquid crystal layer, and each of the light-shielding layers is provided with a plurality of first light-transmitting regions and a plurality of second light-transmitting regions, wherein each of the first light transmitting regions on each of the light-shielding layers corresponds to a position of one or more adjacent color filter units, and projections in a vertical direction of the one or more adjacent color filter units and the first-light transmitting region corresponding to the one or adjacent ones of the color filter units are at least partially overlapped, wherein the plurality of second light-transmitting regions on each of the light-shielding layers correspond to positions of the plurality of light path openings in a one-to-one manner, and projections in the vertical direction of each of the light path openings, the second light-transmitting region corresponding to the each of the light path openings, the optical micro-lens corresponding to the each of the light path openings, and the top openings of the retaining wall structures corresponding to the each of the light path openings are at least partially overlapped.

In a second aspect, an embodiment of the present disclosure also provides a liquid crystal display panel, which includes:
a color filter substrate provided with a plurality of light path openings;
a driving substrate arranged opposite to the color filter substrate;
a liquid crystal layer located between the color filter substrate and the driving substrate; and
a plurality of photosensitive sensor units formed on a surface of a side of the driving substrate close to the liquid crystal layer or formed inside the driving substrate;
wherein a plurality of retaining wall structures are provided in the liquid crystal layer, the retaining wall structures are hollow, a top and a bottom of each of the retaining wall structures are both opened, a top opening of each of the retaining wall structure is aligned with at least one of the light path openings, and a bottom opening of each of the retaining wall structures is aligned with one of the photosensitive sensor units.

Optionally, in some embodiments of the present disclosure, a material of the retaining wall structures is a black light-absorbing material.

Optionally, in some embodiments of the present disclosure, a height of the retaining wall structures is equal to a thickness of the liquid crystal layer.

Optionally, in some embodiments of the present disclosure, a cross section of one of the retaining wall structures is in a square shape, a ring shape, or a wrapping structure composed of multiple strips.

Optionally, in some embodiments of the present disclosure, the color filter substrate comprises a transparent substrate, a filter layer, and a black matrix layer, the filter layer comprises a plurality of color filter units and are located on a side of the transparent substrate close to the liquid crystal layer, the black matrix layer is arranged between any two adjacent color filter units, and the plurality of light path openings are located on the black matrix layer.

Optionally, in some embodiments of the present disclosure, the color filter substrate further comprises light-shielding layers, and each of the light-shielding layers is provided with a plurality of first light-transmitting regions and a plurality of second light-transmitting regions, wherein each of the first light-transmitting regions on each of the light-shielding layers corresponds to a position of one or more adjacent color filter units, and projections in a vertical direction of the one or more adjacent color filter units and the first light-transmitting region corresponding to the one or more adjacent color filter units are at least partially overlapped, wherein the plurality of second light-transmitting regions on each of the light-shielding layers corresponds to positions of the plurality of light path openings in a one-to-one manner, and projections in the vertical direction of each of the light path openings, the second light-transmitting region corresponding to each of the light path openings, and the top opening of the retaining wall structure corresponding to each of the light path openings are at least partially overlapped.

Optionally, in some embodiments of the present disclosure, the light-shielding layer is located between the transparent substrate and the black matrix layer and/or between the black matrix layer and the liquid crystal layer.

Optionally, in some embodiments of the present disclosure, the color filter substrate further comprises a plurality of optical micro-lenses, the plurality of optical micro-lenses are located on a side of the transparent substrate close to the black matrix layer, and positions of the plurality of optical micro-lenses correspond to the plurality of light path openings in a one-to-one manner.

Optionally, in some embodiments of the present disclosure, at least one planarization layer is filled between the plurality of optical micro-lenses and the liquid crystal layer, and refractive indexes of the planarization layer and the optical micro-lens are not equal.

Optionally, in some embodiments of the present disclosure, light-shielding layers are provided between the optical micro-lens and the liquid crystal layer, and each of the light-shielding layers is provided with a plurality of first light-transmitting regions and a plurality of second light-transmitting regions, wherein each of the first light transmitting regions on each of the light-shielding layers corresponds to a position of one or more adjacent color filter units, and projections in a vertical direction of the one or more adjacent color filter units and the first-light transmitting region corresponding to the one or adjacent ones of the color filter units are at least partially overlapped, wherein the plurality of second light-shielding regions on each of the light-shielding layers correspond to positions of the plurality of light path openings in a one-to-one manner, and projections in the vertical direction of each of the light path openings, the second light-transmitting region corresponding to the each of the light path openings, the optical micro-lens corresponding to the each of the light path openings, and the top openings of the retaining wall structures corresponding to the each of the light path openings are at least partially overlapped.

BENEFICIAL EFFECT OF PRESENT DISCLOSURE

Beneficial Effect

Compared with the prior art, the embodiment of the present disclosure adopts retaining wall structures to prevent large-angle photosensitive light signals from being received by the photosensitive sensor unit, and effectively absorbs light interference signals, thereby improving the signal-to-noise ratio of fingerprint signals and fingerprint recognition accuracy. The retaining wall structures of the present disclosure can also be matched with a light-shielding layer includes a light-transmitting region to further reduce large-angle interference signals by the light-shielding layer. At the same time, the light path structure formed by the light-transmitting region of the shielding layer and the light path opening of the black matrix layer has a collimating effect on optical signals, so that the light signal is more accurately emitted into the retaining wall structures to be received by the photosensitive sensor unit, thereby further improving the signal-to-noise ratio. In addition, the retaining wall structures of the present disclosure can also be equipped with optical micro-lenses, the optical signals in the area above the photosensitive sensor unit can be collected and emitted into the retaining wall structure to be received by the photosensitive sensor unit through the optical micro-lens, and the interfering light signal is scattered by the micro lens and absorbed by the retaining wall structure, thereby further improving the signal-to-noise ratio.

DETAILED DESCRIPTION OF EMBODIMENTS

Embodiments of the Present Disclosure

The embodiment of the present disclosure provides a liquid crystal display panel. Detailed descriptions are provided below. It should be noted that the description order of the following embodiments is not intended to limit the preferred order of the embodiments.

Please refer to FIG. 1 to FIG. 5, a liquid crystal display panel according to a first embodiment of the present disclosure is shown. The liquid crystal display panel includes: a color filter substrate 100, a driving substrate 300, a liquid crystal layer 200, a plurality of photosensitive sensor units 500, and a plurality of retaining wall structures 400.

The color filter substrate 100 is provided with a plurality of light path openings 131. Optionally, as shown in A to D of FIG. 1 and A to D of FIG. 2, the plurality of light path openings 131 may be arranged in an array, a cross section of the light path opening 131 may be rectangular including square, circular, or hexagonal shapes, wherein the circular shape is preferable, because a circular structure can make a collimation effect of optical signals in various directions more uniform, but a cross section of the optical path opening 131 is not limited to the above-mentioned shapes. Other shapes are also applicable to the liquid crystal display panel described in the present disclosure. The light path opening 131 is configured to allow a light signal reflected by the fingerprint to pass through the color filter substrate 100 to be finally received by the photosensitive sensor unit 500. By arranging multiple light paths on the color filter substrate 100, the plurality of light path openings 131 can also have a certain extent of "small hole-like" collimation effect.

Figure 4:
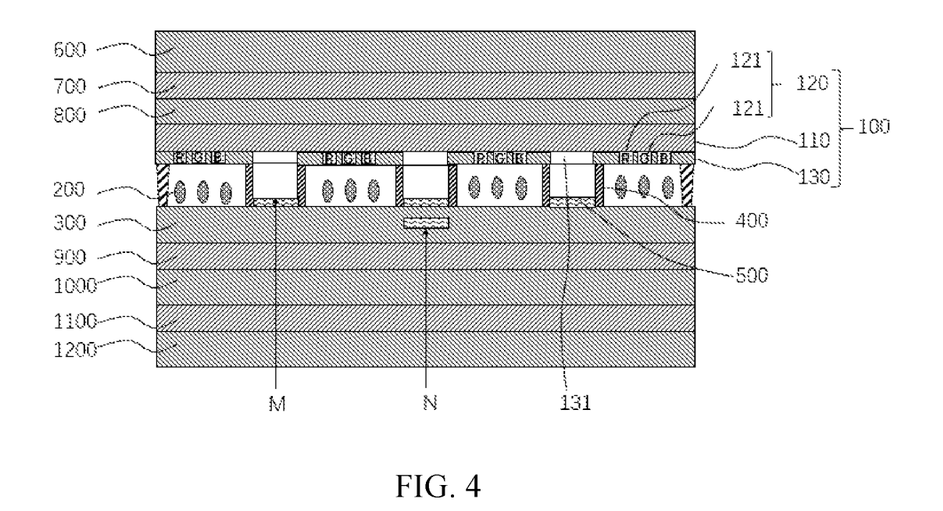
FIG. 4 is a cross sectional view of the liquid crystal display panel according to the first embodiment of the present disclosure along an R-R direction shown in A of FIG. 1.

As shown in FIG. 4, in one embodiment, the color filter substrate 100 includes a transparent substrate 110, a filter layer 120, and a black matrix layer 130. The transparent substrate 110 is light-transmissive; for example, it may be a glass substrate. The filter layer 120 includes a plurality of color filter units 121 provided on a side of the transparent substrate 110 close to the liquid crystal layer 200; specifically, the plurality of color filter units 121 include three colors filter units (RGB), which are a red filter unit (R), a green filter unit (G), and a blue filter unit (B) respectively, which are configured to form display pixels of the liquid crystal display panel. The black matrix layer 130 is arranged between any two adjacent color filter units 121, wherein the black matrix layer 130 has light absorption properties and can be made of black light absorption materials, such as black organic photoresist materials. The plurality of light path openings 131 are defined on the black matrix layer 130.

It should be noted that, since the plurality of light path openings 131 are defined on the black matrix layer 130, and the black matrix layer 130 is provided between any two adjacent color filter units 121, the light path openings 131 are actually defined around the color filter units 121, and any one of the light path openings 131 and the color filter units 121 do not overlap. In other words, any one of the light path openings 131 is not overlapped with the display pixel area. In one embodiment, as shown in A to B of FIG. 1 and A to B of FIG. 2, the plurality of light path openings 131 may be arranged between laterally adjacent color filter units 121 (X Direction). In another embodiment, as shown in C to D of FIG. 1 and C to D of FIG. 2, the plurality of light path openings 131 may also be arranged between longitudinally adjacent color filter units 121 (Y direction).

Figure 1:
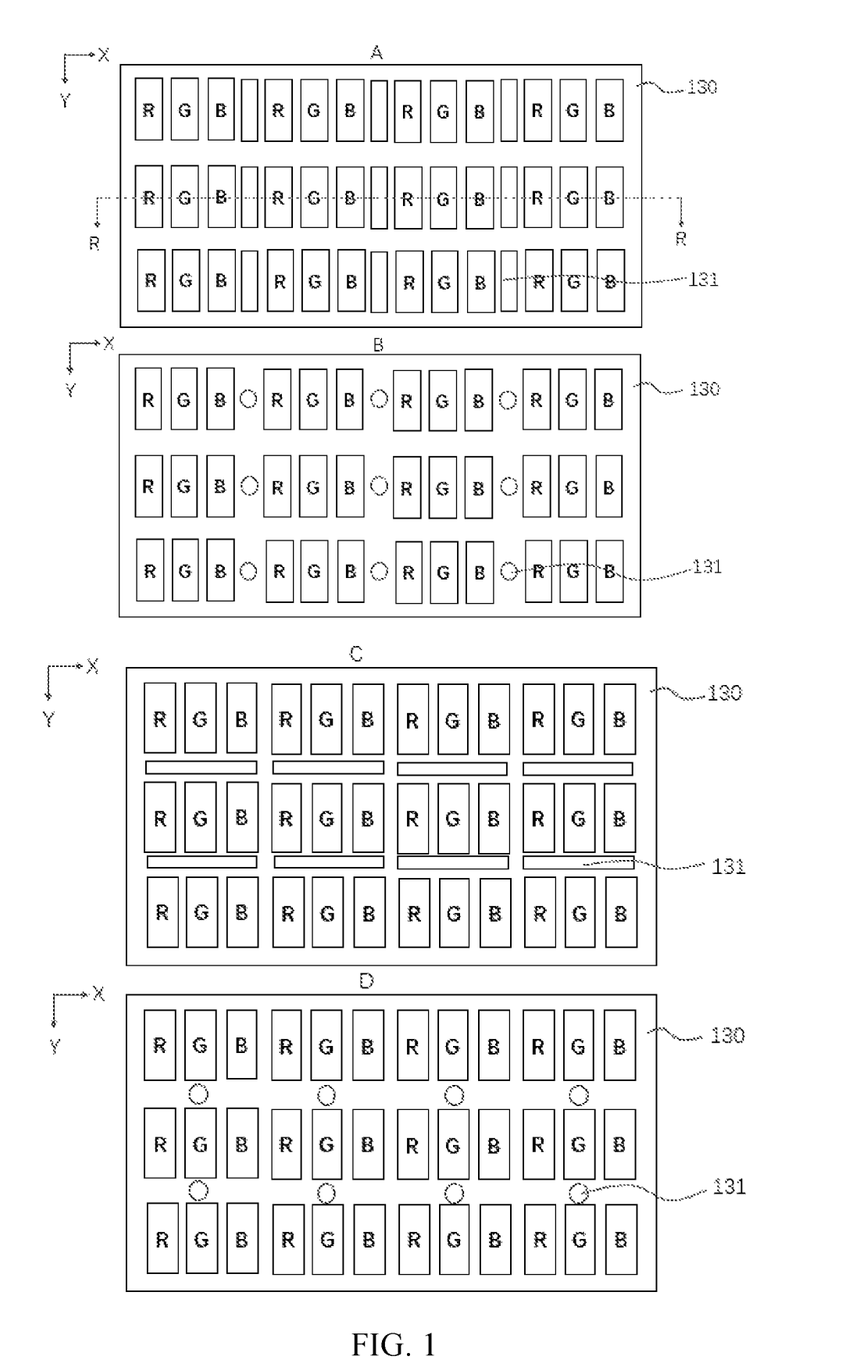
FIG. 1 is a schematic top view of several examples of black matrix layers of a liquid crystal display panel according to a first embodiment of the present disclosure.
Figure 2:
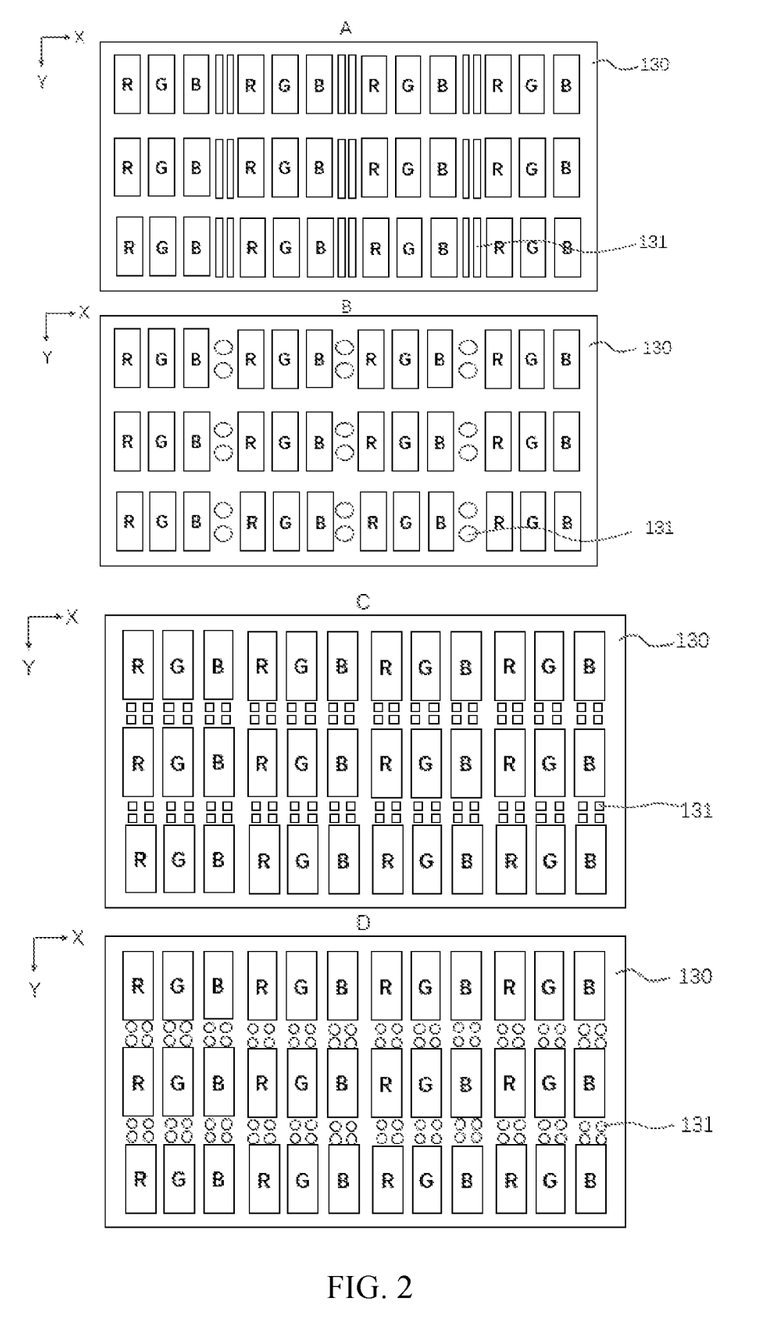
FIG. 2 is a schematic top view of other examples of black matrix layers of the liquid crystal display panel according to the first embodiment of the present disclosure.

It should be noted that FIG. 4 only shows a cross sectional view corresponding to the liquid crystal display panel shown in A of FIG. 1, and this embodiment takes it as an example for description, although this embodiment does not show corresponding cross sectional views B to D of the liquid crystal display panel of FIG. 1 and cross sectional views A to D of FIG. 2, the liquid crystal display panels corresponding to B to D of FIG. 1 and A to D of FIG. 2 are only conventional deformations of A of FIG. 1 and the liquid crystal display panel shown in FIG. 4, and they are still within the protection scope of the present disclosure.

As shown in FIG. 4, the driving substrate 300 is arranged opposite to the color filter substrate 100. Specifically, the driving substrate 300 is provided with a plurality of scan lines, a plurality of data lines, a plurality of pixel driving electrodes, a plurality of thin film transistors (TFT), and other functional elements. The plurality of scan lines and the plurality of data lines are vertically interleaved to define a plurality of pixel units, and each pixel unit is provided with at least one pixel driving electrode and at least one thin film transistor. The thin film transistor is connected to a corresponding scan line, a corresponding data line, and a corresponding pixel driving electrode, so as to control the pixel unit to display. The pixel driving electrode may be, for example, an indium tin oxide (ITO) film layer.

As shown in FIG. 4, the liquid crystal layer 200 is located between the color filter substrate 100 and the driving substrate 300. Specifically, the liquid crystal layer 200 contains liquid crystals (LCs), and the driving substrate 300 controls deflection of the liquid crystals to realize display function of the liquid crystal display panel.

As shown in position M in FIG. 4, the plurality of photosensitive sensor units 500 may be formed on a surface of a side of the driving substrate 300 close to the liquid crystal layer 200. Specifically, a film layer of a top surface of the photosensitive sensor unit 500 close to the liquid crystal layer 200 is higher than a film layer of a top surface of the driving substrate 300. For example, a topmost indium tin oxide (ITO) film layer of the photosensitive sensor unit 500 close to the liquid crystal layer 200 is higher than a top surface of the pixel driving electrode of the driving substrate 300. When the plurality of photosensitive sensor units 500 are provided at a position M, the plurality of photosensitive sensor units 500 can be manufactured in combination with the low temperature poly-silicon (LTPS) process, which saves more costs. As shown in position N in FIG. 1, the plurality of photosensitive sensor units 500 may also be formed inside the driving substrate 300. Specifically, the film layer of the top surface of the photosensitive sensor unit 500 close to the liquid crystal layer 200 is lower than the film layer of the top surface of the driving substrate 300. For example, the top indium tin oxide (ITO) film layer of the photosensitive sensor unit 500 close to the liquid crystal layer 200 is lower than the top surface of the pixel driving electrode of the driving substrate 300. When the plurality of photosensitive sensor units 500 are provided at a position N, an optical path design above the plurality of photosensitive sensor units 500 can have a larger utilization space, and difficulty of optical path design is relatively reduced.

It should be noted that the photosensitive sensor unit 500 has the function of recognizing fingerprints. It can receive light signals, convert the light signals into electrical signals, and obtain fingerprint structural features through an algorithm processing unit to realize fingerprint recognition. The photosensitive sensor unit 500 is a conventional technology in the field, and the present disclosure does not set any special limitations thereto. As shown in FIG. 4, in order not to affect an effect of the color filter units 121 forming display pixels, projections in a vertical direction of any one of the photosensitive sensor units 500 are preferably not overlapped with projections in the vertical direction of any one of the color filter units 121/display pixels.

As shown in FIG. 1, the plurality of retaining wall structures 400 are positioned in the liquid crystal layer 200. The retaining wall structures 400 are hollow, a top and a bottom of each of the retaining wall structures are both open. This structure can realize the incidence and emission of fingerprint light signals, while preventing large-angle light interference signals from entering an internal of the retaining wall structures 400. This significantly improves a signal-to-noise ratio of the fingerprint signal. Preferably, the retaining wall structure 400 can be made of black light-absorbing materials, such as black photoresists or other black light-absorbing materials. The black light-absorbing materials enable the plurality of retaining wall structures 400 to effectively absorb light interference signals to further prevent light interference signals from entering the retaining wall structures 400 and being received by the photosensitive sensor unit 500. Optionally, the hollow portions of the retaining wall structures 400 can also be filled with a transparent material, for example, an optically clear adhesive, and the transparent material can also have selective absorbance of a certain wavelength band, for example, selective absorbance of a visible light band 380 nm-780 nm or selective absorbance of a green wavelength band 500 nm-600 nm. It can also be a material that filters out red light. Preferably, a height of the retaining wall structures 400 can be equal to a thickness of the liquid crystal layer 200, which not only enables the top opening of the retaining wall structures 400 to be accurately connected to the light path openings 131, ensuring that the optical signal emitted from the color filter substrate 100 can be accurately emitted into the retaining wall structures 400, but also allows the retaining wall structures 400 to serve as a supporting structure for maintaining the thickness (cell gap) of the liquid crystal layer 200. It should be noted that, since the retaining wall structures 400 are only disposed around the photosensitive sensor units 500, the retaining wall structures 400 can serve as a supporting structure for a fingerprint recognition area inside the liquid crystal display panel, while in other regions in a non-fingerprint recognition area, a transparent photo space (PS) or a black photoresist spacer can be configured as a supporting structure. For example, a balance structure is formed in the liquid crystal layer 200 by exposure to support upper and lower substrates (i.e., the driving substrate 300 and the color filter substrate 100), preferably, can uniformly use the same black light-absorbing material (such as a black photoresist PS), a same mask, and a same process to make all the supporting structures to save more costs.

Figure 5:
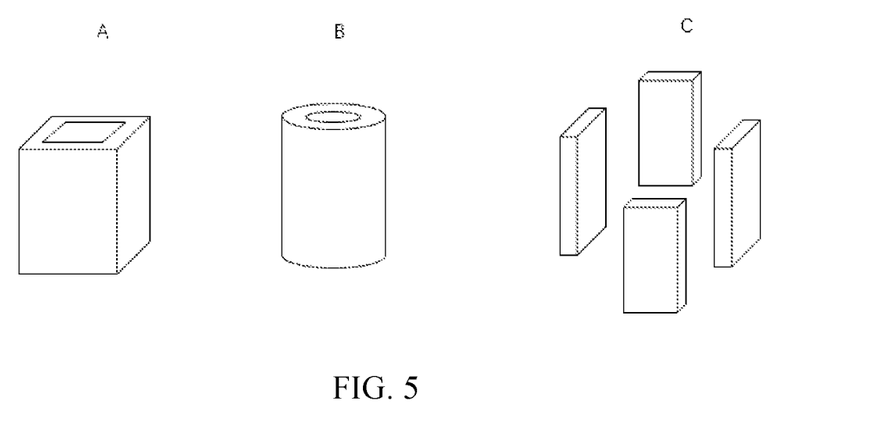
FIG. 5 is a three-dimensional structural diagram of several examples of retaining wall structures of the liquid crystal display panel according to the first embodiment of the present disclosure.

Optionally, as shown in A of FIG. 5, the retaining wall structures 400 may be a hollow cuboid and a cross section is a square shape; as shown in B of FIG. 5, the retaining wall structures 400 may also be a hollow cylinder and a cross section is a ring shape; as shown in C of FIG. 5, C is an exploded view of the retaining wall structure 400, the retaining wall structure 400 can also be hollow and a cross section is a wrapping structure composed of a plurality of structural units, the number of the structural units can be three, four, five, six, or more. The cross section of the retaining wall structure 400 is a wrapping structure composed of multiple strips (i.e., rectangles); for example, the retaining wall structure 400 may be a wrapping structure composed of four rectangular parallelepiped structures, and the cross section of the wrapping structure is four strips (i.e., rectangular). It should be noted that adjacent structural units can be completely closed, which can better prevent large-angle light-sensing light signals from entering. However, without greatly reducing an effect of preventing large-angle light-sensing light signals, a certain gap may be allowed between the adjacent structural units. In the above-mentioned several examples of the retaining wall structures 400, each of the retaining wall structures 400 is preferably a structure with a cross section in a square shape, which can better prevent the photosensitive sensor unit 500 from receiving light interference signals, and which has more concise position alignment and manufacturing process.

As shown in FIG. 4, the top opening of each retaining wall structure 400 is aligned with at least one light path opening 131, so that the optical signal reflected by the fingerprint and passing through the color filter substrate 100 can be emitted into the retaining wall structure 400; and the bottom opening of each retaining wall structure 400 is aligned with one of the photosensitive sensor units 500, so that the light signal emitted from the bottom of the retaining wall structure 400 is emitted into the photosensitive sensor unit 500. Specifically, when the photosensitive sensor unit 500 is formed on a surface of the driving substrate 300, the bottom opening of each retaining wall structure 400 is aligned with one photosensitive sensor unit 500 to make the bottom opening of the retaining wall structure 400 surround the photosensitive sensor units 500; that is, the photosensitive sensor unit 500 is accommodated in the bottom opening of the retaining wall structure 400, so that the retaining wall structure 400 surrounds the photosensitive area of the photosensitive sensor unit 500, thereby ensuring that the light signal can be accurately received by the photosensitive sensor unit 500, wherein when the plurality of photosensitive sensor units 500 are formed inside the driving substrate 300, the bottom opening of each the retaining wall structures 400 is aligned with one of the photosensitive sensor units 500. For example, the bottom opening of the retaining wall structure 400 is defined directly above the photosensitive sensor unit 500, so that the retaining wall structure 400 surrounds the photosensitive area of the photosensitive sensor unit 500, wherein a portion between the photosensitive sensor unit 500 and the bottom opening of the retaining wall structure 400 on the driving substrate 300 is light-transmissive, for example by adopting a light-transmitting material or a light-transmitting structure (such as a gap preferably 0.5 μm or less), so that the light signal emitted from the retaining wall structure 400 can be received by the photosensitive sensor unit 500.

In addition, in order to enable the photosensitive sensor unit 500 to better receive light signals, a size of the bottom opening of the retaining wall structure 400 may be greater than or equal to a size of the photosensitive sensor unit 500 aligned/butted with the retaining wall structure 400, a size of the top opening of the retaining wall structure 400 may be greater than or equal to the size of the light path opening 131 aligned/butted with the retaining wall structure 400. For example, the size of the top opening and bottom opening of the retaining wall structure 400 may both be between 5 and 10 microns, and the size of the light path opening 131 may be designed according to the top opening of the retaining wall structure 400.

It should be noted that a correspondence between the top opening of the retaining wall structure 400 and the light path opening 131 can be a one-to-one or one-to-many manners; a correspondence between the bottom opening of the retaining wall structure 400 and the photosensitive sensor units 500 can be one-to-one manner; and a correspondence between the photosensitive sensor units 500 and the light path openings 131 can also be one-to-one or one-to-many manners. For example, referring to A (or B) in FIG. 1 and A of FIG. 3 at the same time, A (or B) in FIG. 1 shows that one light path opening 131 is provided between two sets of laterally adjacent (X-direction) RGB, combined with the schematic diagram of the projection relationship in the vertical direction between the photosensitive sensor units 500 and the color filter units 121 shown in A of FIG. 3, it can be seen that: one photosensitive sensor unit 500 corresponds to one optical path opening 131; and further for example, referring to C (or D) of FIG. 2 and B of FIG. 3 at the same time, C (or D) of FIG. 2 shows that a plurality of light path openings 131 are arranged between two sets of longitudinally adjacent (Y direction) RGB, in conjunction with the schematic diagram of the projection relationship in the vertical direction between the photosensitive sensor 500 and the color filter unit 121 shown in B of FIG. 3, it can be seen that one photosensitive sensor unit 500 corresponds to a plurality of light path openings 131.

It should be noted that, in addition to the aforementioned components, the liquid crystal display panel may also include any other structure as required. For example, the liquid crystal display panel further includes a glass cover 600, an adhesive 700, an upper polarizer 800, a lower polarizer 900, a backlight source 1000, a reflective sheet 1100, and a back plate structure 1200. The liquid crystal display panel is constituted as shown in FIG. 1, which from top to bottom is the glass cover 600, the adhesive 700, the upper polarizer 800, the transparent substrate 110, the black matrix layer 130, the filter layer 120, the liquid crystal layer 200, the driving substrate 300, the lower polarizer 900, the backlight source 1000, the reflective sheet 1100, and the back plate structure 1200.

In summary, in the liquid crystal display panel of the embodiment of the present disclosure, the retaining wall structure 400 is formed in the photosensitive area of each photosensitive sensor unit 500, and the retaining wall structure 400 can block large-angle photosensitive light signals and effectively absorb light interference signals, thereby improving the signal-to-noise ratio of the fingerprint signal and the accuracy of fingerprint recognition.

In order to further reduce large-angle interference signals, improve the optical path alignment effect of the fingerprint recognition light path structure, and thereby increasing the signal-to-noise ratio of the fingerprint signal received by the photosensitive sensor unit 500, at least one layer of the light-shielding layer 140 with a light-transmitting region is added to the color filter substrate 100. The light-shielding layer 140 with a light-transmitting region can further reduce interference signals, and can also form a more precise collimation structure with the light path opening 131 to collimate the optical signal, thereby improving the signal-to-noise ratio of the fingerprint signal.

Figure 6:
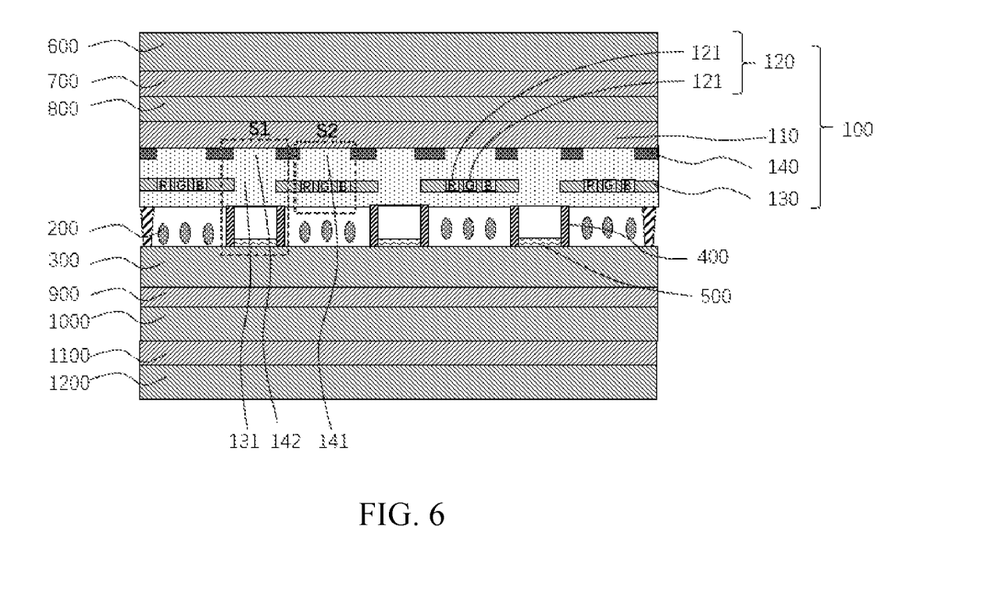
FIG. 6 is a cross sectional view of the liquid crystal display panel according to a second embodiment of the present disclosure along the R-R direction shown in A of FIG. 1.
Figure 7:
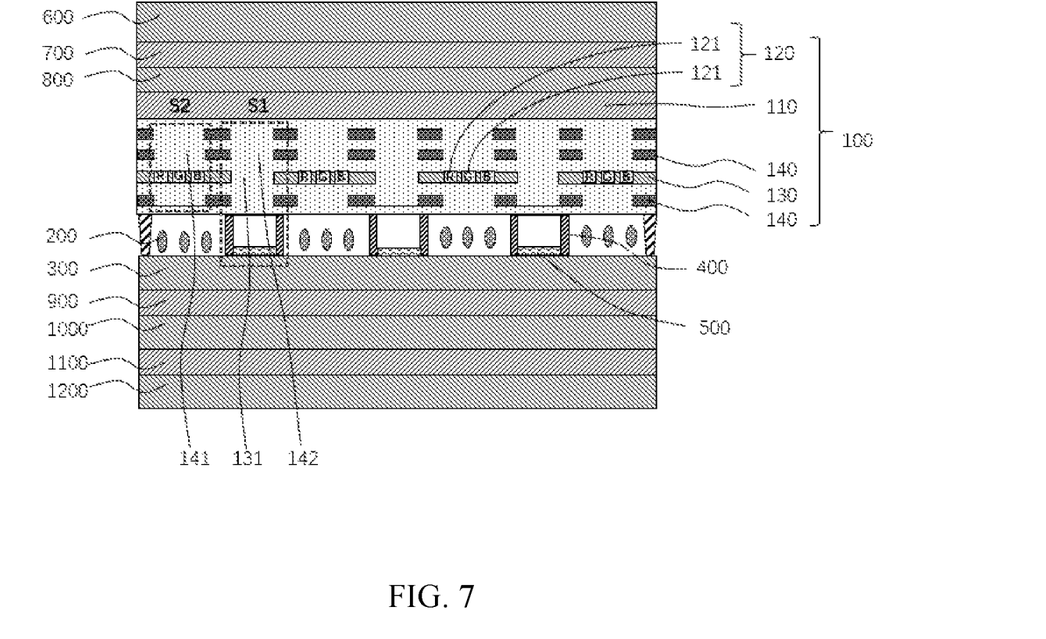
FIG. 7 is a cross sectional view of the liquid crystal display panel according to the second embodiment of the present disclosure along the R-R direction shown in A of FIG. 1.
Figure 8:
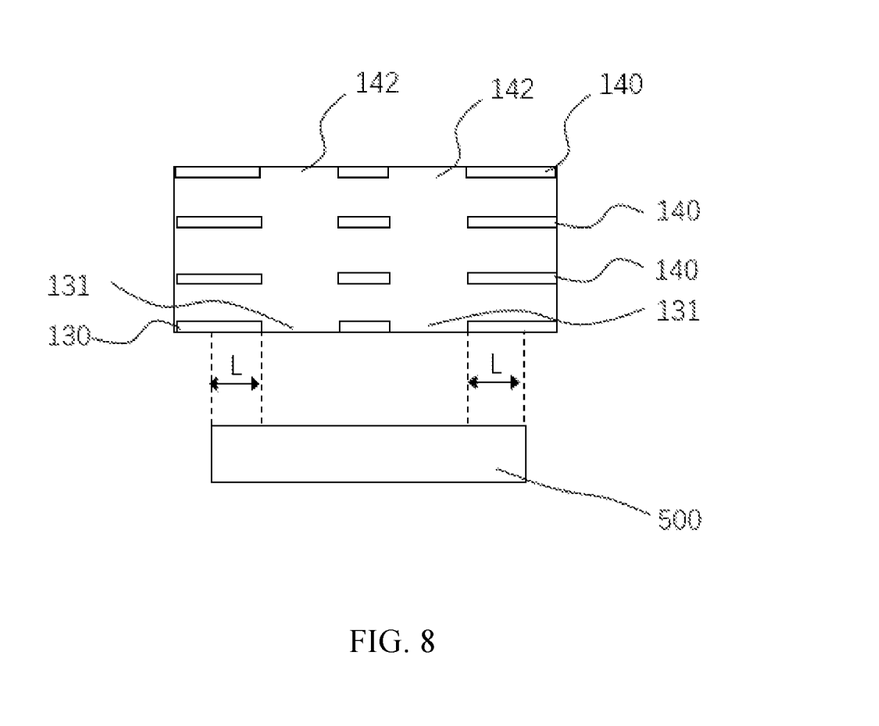
FIG. 8 is a schematic diagram of a corresponding relationship of a photosensitive sensor, a light path opening, and a second light-transmitting region of the liquid crystal display panel according to the second embodiment of the present disclosure.

As shown in FIGS. 6 to 8, a liquid crystal display panel of the second embodiment of the present disclosure is provided. In addition to the structure described in the liquid crystal display panel of the first embodiment, the color filter substrate 100 further includes at least one light-shielding layer 140. The number of the light-shielding layers 140 may be one layer (as shown in FIG. 6) or multiple layers (as shown in FIG. 7).

As shown in FIGS. 6 and 7, each layer of the light-shielding layer 140 is provided with a plurality of first light-transmitting regions 141 and a plurality of second light-transmitting regions 142.

As shown in the region S2 of FIG. 6 and FIG. 7, each of the first light-transmitting region 141 on each of the light-shielding layer 140 corresponds to a position of one or more adjacent color filter units 121, and a projection of the one or more adjacent color filter units 121 in a vertical direction at least partially, and preferably entirely, overlap with a projection of the first light-transmitting region 141 corresponding to the one or more adjacent color filter units 121. In this way, the light filtered by the color filter unit 121 can pass through the light-shielding layer 140, thereby not affecting the display effect of the display pixels of the liquid crystal display panel.

As shown in the region S1 of FIGS. 6 and 7, the plurality of second light-transmitting regions 142 on each of the light-shielding layers 140 corresponds to positions of the plurality of light path openings 131 in a one-to-one manner, and projections in the vertical direction of each of the light path openings 131, the second light-transmitting region 142 on each of the light-shielding layers 140 corresponds to each of the light path openings 131, and the top opening of the retaining wall structure 400 corresponding to each of the light path openings 131 are at least partially overlapped, and are preferably entirely overlapped. It should be noted that when each of the light path openings 131 and all the second light-transmitting regions 142 corresponding to the light path openings 131 are completely aligned, the light signal can pass through the color filter substrate 100 well, but due to the influence of factors such as process, it may lead to incomplete alignment and small size dislocation, this situation is allowed. In a preferred embodiment, projections in the vertical direction of each of the light path openings 131, and the second light-transmitting region 142 corresponding to the light path openings 131 on each layer of the light-shielding layer 140, and the top opening of the retaining wall structure 400 corresponding to the light path openings 131, and the photosensitive sensor unit 500 corresponding to the light path openings 131 are at least partially overlapped, preferably entirely overlapped. Optionally, the overlapping region may be smaller than, equal to or larger than the size of the photosensitive sensor unit 500. In order not to affect the display effect of the liquid crystal display panel, the overlapping region and projections in the vertical direction of the color filter unit 121 or the display pixel formed by the color filter unit 121 are preferably not overlapped. In this embodiment, the second light-transmitting region 142 is combined with the light path opening 131 to form the light path structure of the fingerprint optical signal, so that the optical signal reflected by the fingerprint can pass through the color filter substrate 100 and be emitted into the retaining wall structure 400 further collimates the optical signal at the same time, wherein the more layers the light-shielding layer 140 be provided, the better the effect of improving the signal-to-noise ratio of the fingerprint signal.

In addition, as shown in FIG. 8 (the retaining wall structure 400 is not shown in the figure), a correspondence between the light path opening 131 and the second light-transmitting region 142 is in a one-to-one manner, and a correspondence between the photosensitive sensor unit 500 and the light path opening 131/the second light-transmitting region 142 may be the in a one-to-many manner. Regardless of the correspondence, the size of the photosensitive sensor unit 500 may be larger than, equal to, or smaller than an optical path opening 131. Preferably, the size of the photosensitive sensor unit 500 is larger than the light path opening 131, so that even if the light path opening 131 and the second light-transmitting region 142 are not accurately aligned, the photosensitive sensor unit 500 can better receive light signals. For example, the size of the photosensitive sensor unit 500 is large enough that the side edge portion of the photosensitive sensor unit 500 and the shielding area of the black matrix layer 130 (except the black area of the light path opening 31) are in a vertical direction. An overlap size of the projections (L shown in FIG. 8) is larger than 5 μm.

Figure 3:
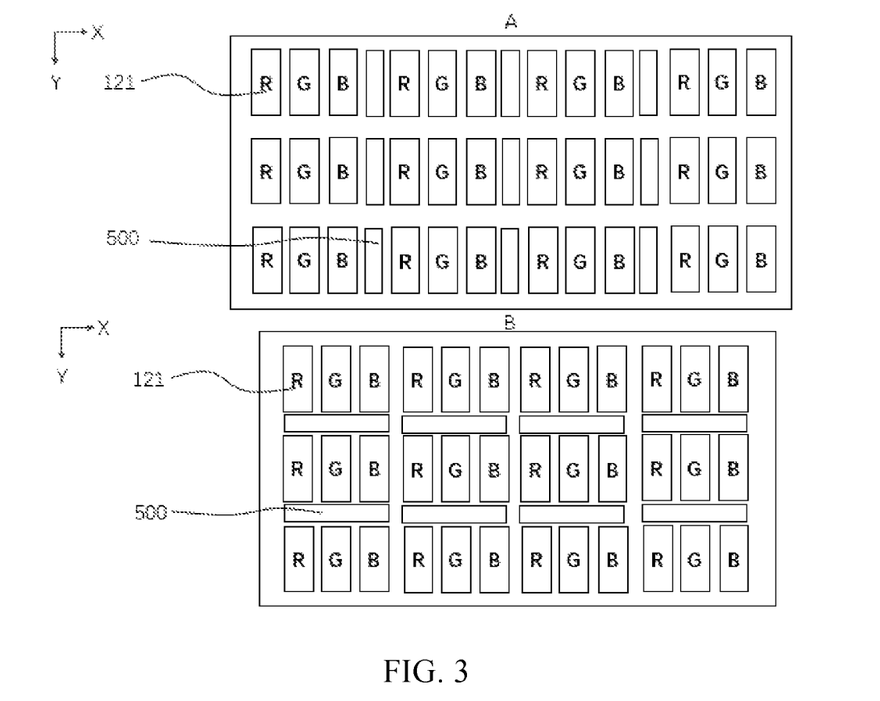
FIG. 3 is a schematic diagram of a projection relationship in a vertical direction between several photosensitive sensors and color filter units of the liquid crystal display panel according to the first embodiment of the present disclosure.

As shown in FIGS. 2 and 3, optionally, the shape of the light path openings 131 are the same, the cross section of the second light-transmitting region 142/the first light-transmitting region 141 may be a rectangular (including square), a circle or a hexagon, etc., preferably a circle, and the collimation effect of the optical signal in each direction is more uniform by using the circle. The inside of the second light-transmitting area 142/the first light-transmitting area 141 may be filled with a transparent material, for example, including but not limited to transparent optical glue (OC), such as photosensitive transparent optical glue, photo space, (PS) and transparent plastic materials such as epoxy resin.

As shown in FIG. 7, the light-shielding layer 140 is provided between the transparent substrate 110 and the black matrix layer 130 and/or between the black matrix layer 130 and the liquid crystal layer 200. Specifically, when the number of the light-shielding layer 140 is one layer, it may be provided between the transparent substrate 110 and the black matrix layer 130, or between the black matrix layer 130 and the liquid crystal layer 200, when the number of light-shielding 140 layers is multiple, they can all be arranged between the transparent substrate 110 and the black matrix layer 130, or all can be arranged between the black matrix layer 130 and the liquid crystal layer 200, or it can also be arranged between the transparent substrate 110 and the black matrix layer 130 and between the black matrix layer 130 and the liquid crystal layer 200 at the same time. The number of the light-shielding layer 140 is preferably, but not limited to, two layers, which can meet the requirements of optical path alignment, absorption of interference signals, etc., without making the process too complicated. In addition, when the light-shielding layer 140 exists between the black matrix layer 130 and the liquid crystal layer 200, the top opening of the retaining wall structure 400 may be aligned with the second light-transmitting region 142 corresponding to the top opening of the retaining wall structure 400.

It should be noted that the light-shielding area of the light-shielding layer 140 (except for the first light-transmitting region 141 and the second light-transmitting region 142) and the shielding area of the black matrix layer 130, except for the areas other than the light path opening 131, have a light-absorbing effect, which can absorb large-angle light interference signals and improve the signal-to-noise ratio of fingerprint signals. The two can use the same or different black light-absorbing materials, such as black photoresist materials. Between the different light-shielding layers 140, between the black matrix layer 130 and the light-shielding layer 140 adjacent to it, and between the black matrix layer 130/the light-shielding layer 140 and the liquid crystal layer 200 may be filled with transparent materials, for example, including but not limited to transparent optical glue (OC), photosensitive transparent optical glue (OC), photo space (PS), epoxy resin, and other transparent glue materials.

In addition to the light path structures described above, the present disclosure also provides another light path structure. This type of light path structure provides a plurality of optical micro-lenses 150 in the color filter substrate 100. By matching with the optical micro-lens 150, the optical signal of the fingerprint in an area above the photosensitive sensor unit 500 can be concentrated and emitted into the retaining wall structures 400, and then received by the photosensitive sensor unit 500, while the interference light signal is scattered by the optical micro-lens 150, thereby further improving the signal-to-noise ratio.

Figure 9:
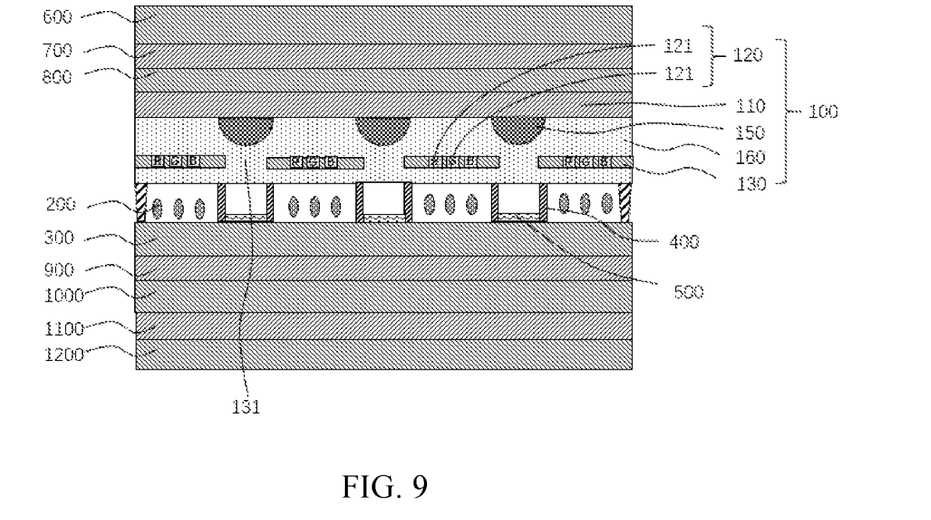
FIG. 9 is a cross sectional view of the liquid crystal display panel according to a third embodiment of the present disclosure along the R-R direction shown in A of FIG. 1.
Figure 10:
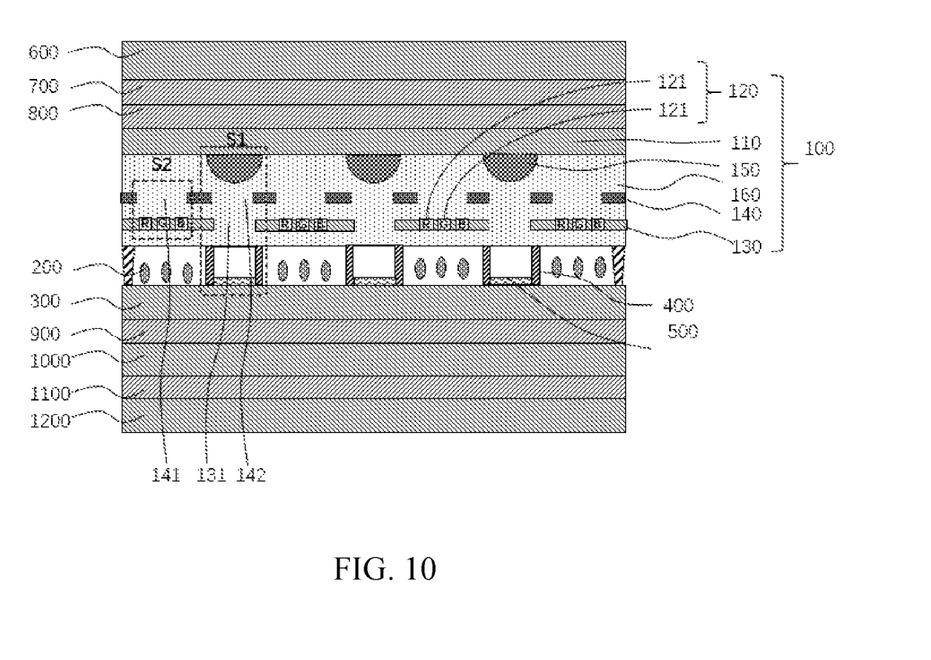
FIG. 10 is a cross sectional view of the liquid crystal display panel according to the third embodiment of the present disclosure along the R-R direction shown in A of FIG. 1.

As shown in FIGS. 9 and 10, a liquid crystal display panel according to a third embodiment of the present disclosure is provided. In addition to the structure described in the first embodiment, the color filter substrate 100 further includes a plurality of optical micro-lenses 150.

The plurality of optical micro-lenses 150 are located on a side of the transparent substrate 110 and close to the black matrix layer 130, and positions of the plurality of optical micro-lenses 150 correspond to the plurality of light path openings 131 in a one-to-one manner. The optical micro-lenses 150 can converge the fingerprint light signal to the photosensitive area of the photosensitive sensor unit 500 surrounded by the retaining wall structures 400, which not only improves the signal-to-noise ratio, but also enables a size of the photosensitive sensor unit 500 can be made smaller, and increases a display aperture ratio accordingly.

A refractive index of the optical micro-lenses 150 is different from a refractive index of its surrounding materials. Within a certain range, the greater the difference between the two is, the better the optical micro-lenses 150 can converge light signals and the better the fingerprint recognition effect. For example, as shown in FIG. 9, at least one planarization layer 160 is filled between the plurality of optical micro-lenses 150 and the liquid crystal layer 200. The refractive index of the planarization layer 160 and the refractive index of the optical micro-lenses 150 are not equal, and the greater the difference between the two is better.

As shown in FIG. 10, optionally, at least one light-shielding layer 140 can be added under the optical micro-lenses 150 to reduce large-angle light interference signals. The light-shielding layer 140 is provided between the optical micro-lenses 150 and the liquid crystal layer 200. Specifically, when a number of the light-shielding layer 140 is one layer, the light-shielding layer 140 may be provided between the optical micro-lenses 150 and the black matrix layer 130, or may be provided between the black matrix layer 130 and the liquid crystal layer 200, when the number of the light-shielding layer 140 is multiple, all of them can be arranged between the optical micro-lenses 150 and the black matrix layer 130, or all of them can be arranged between the black matrix layer 130 and the liquid crystal layer 200, or may also be arranged between the black matrix layer 130 and the liquid crystal layer 200 and between the optical micro-lenses 150 and the black matrix layer 130 at the same time.

Each of the light-shielding layers 140 is provided with a plurality of first light-transmitting regions 141 and a plurality of second light-transmitting regions 142. As shown in the region S2 of FIG. 10, projections in the vertical direction of each of the first light-transmitting regions 141 on each of the light-shielding layers 140 corresponds to a position of one or more adjacent color filter units 121, and projections in the vertical direction of the one or adjacent ones of color filter units 121 and the first-light transmitting region 141 corresponding to the one or more adjacent color filter units 121 are at least partially overlapped, preferably entirely overlapped. As shown in the region S1 of FIG. 10, wherein the plurality of second light-transmitting regions 142 on each of the light-shielding layers 140 correspond to positions of the plurality of light path openings 131 in a one-to-one manner, and projections in the vertical direction of each of the light path openings 131, the second light-transmitting region 142 corresponding to the each of the light path openings 131, the optical micro-lens 150 corresponding to the each of the light path openings 131, and the top openings of the retaining wall structures 400 corresponding to the each of the light path openings 131 are at least partially overlapped, preferably entirely overlapped. Preferably, projections in the vertical direction of each of the light path openings 131, all the second light-transmitting region 142 corresponding to the each of the light path openings 131 of each of the light-shielding layers 140, the optical micro-lens 150 corresponding to the each of the light path openings 131, and the top openings of the retaining wall structures 400 corresponding to the each of the light path openings 131 are at least partially overlapped, preferably entirely overlapped.

Figure 11:
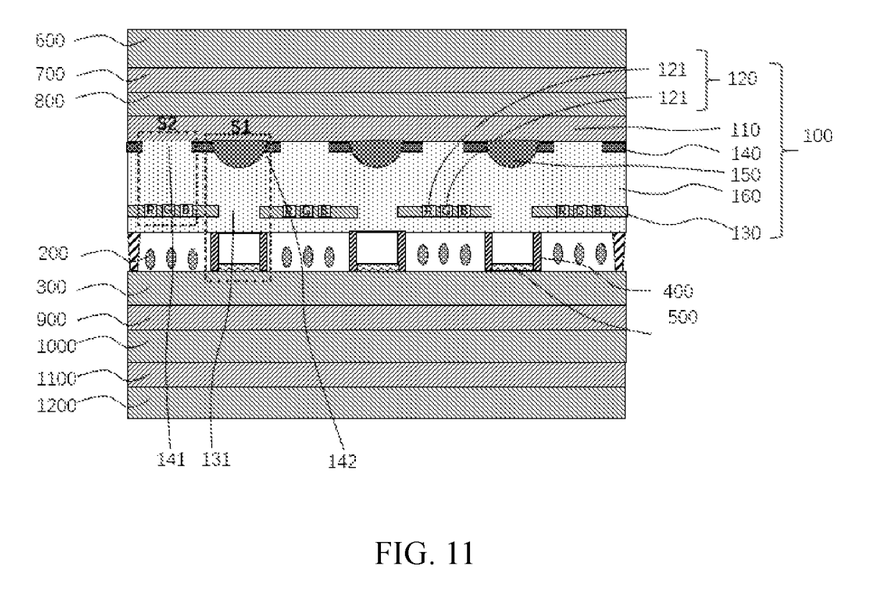
FIG. 11 is a cross sectional view of the liquid crystal display panel according to the third embodiment of the present disclosure along the R-R direction shown in A of FIG. 1.

As shown in FIG. 11, optionally, one of the light-shielding layers 140 can also be provided in the same layer as the optical micro-lenses 150, and the light-shielding layer 140 is provided with a plurality of first light-transmitting regions 141 and a plurality of second light-transmitting region 142. As shown in the region S2 of FIG. 11, projections in the vertical direction of each of the first light-transmitting regions 141 on each of the light-shielding layers 140 corresponds to a position of one or more adjacent color filter units 121, and projections in the vertical direction of the one or adjacent ones of color filter units 121 and the first-light transmitting region 141 corresponding to the one or more adjacent color filter units 121 are at least partially overlapped, preferably entirely overlapped. As shown in the region S1 in FIG. 11, the optical micro-lenses 150 are provided in the second light-transmitting region 142, and positions of the plurality of optical micro-lenses 150 correspond to the plurality of light path openings 131 in a one-to-one manner, and projections in the vertical direction of each of the optical micro-lenses 150, the light path openings 131 corresponding to the plurality of optical micro-lenses 150, and the top openings of the retaining wall structures 400 corresponding to the each of the light path openings 131 are at least partially overlapped, preferably entirely overlapped. Preferably, projections in the vertical direction of each of the optical micro-lenses 150, the light path openings 131 corresponding to the plurality of optical micro-lenses 150, the top openings of the retaining wall structures 400 corresponding to the each of the light path openings 131, and a plurality of photosensitive sensor units 500 corresponding to the light path openings 131 are at least partially overlapped, preferably entirely overlapped. It can be understood that when a number of the light-shielding layers 140 is greater than one, the other light-shielding layers 140 may be arranged between the optical micro-lens 150 and the black matrix layer 130, or may be arranged between the black matrix layer 130 and the liquid crystal layer 200, the structure of the light shielding layer 140 can refer to the foregoing description, and will not be repeated here.

Embodiments of the present disclosure also provides a display device, which includes the liquid crystal display panel of any one of the above embodiments or a combination of multiple embodiments.

It should be noted that the vertical direction in each of the above-mentioned embodiments refers to the direction perpendicular to the liquid crystal display panel. It should be understood that the vertical direction is also perpendicular to the color filter substrate 100, the driving substrate 300, and the direction of each layer. In the following embodiments, the cross section refers to a cross section parallel to the direction of the liquid crystal display panel. It can be understood that the direction parallel to the liquid crystal display panel is also parallel to the color filter substrate 100 and the direction of each film layer such as the substrate 300.

In the above-mentioned embodiments, the description of each embodiment has its own focus. For parts that are not described in detail in an embodiment, reference may be made to related descriptions of other embodiments.

The foregoing describes in detail a liquid crystal display panel provided by the embodiments of the present disclosure. Specific examples are used in the descriptions to describe the principles and implementations of the present disclosure. The descriptions of the above embodiments are only used to help understand the method of the present disclosure, and its core ideas. At the same time, for those skilled in the art, based on the idea of the present disclosure, there will be changes in the specific implementation and the scope of the present disclosure. In summary, the content of this specification should not be construed as a limitation of the present disclosure.

What is claimed is:

1. A liquid crystal display panel, comprising:
a color filter substrate provided with a plurality of light path openings;
a driving substrate arranged opposite to the color filter substrate;
a liquid crystal layer located between the color filter substrate and the driving substrate; and
a plurality of photosensitive sensor units formed on a surface of a side of the driving substrate close to the liquid crystal layer or formed inside the driving substrate;
wherein a plurality of retaining wall structures are provided in the liquid crystal layer, the retaining wall structures are hollow, a top and a bottom of each of the retaining wall structures are both open, a top opening of each of the retaining wall structures is aligned with at least one of the light path openings, and a bottom opening of each of the retaining wall structures is aligned with one of the photosensitive sensor units;
wherein a material of the retaining wall structures is a black light-absorbing material, hollow portions of the retaining wall structures are filled with a transparent material that is different from the material of the liquid crystal layer, and a height of the retaining wall structures is equal to a thickness of the liquid crystal layer; and
wherein each of the plurality of photosensitive sensor units contacts and is surrounded by one of plurality of retaining wall structures.

2. The liquid crystal display panel according to claim 1, wherein the transparent material is an optically clear adhesive.

3. The liquid crystal display panel according to claim 1, wherein the transparent material has selective absorptance.

4. The liquid crystal display panel according to claim 3, wherein the transparent material has selective absorptance in a visible light waveband.

5. The liquid crystal display panel according to claim 1, wherein the transparent material has a characteristic that filters out red light.

6. The liquid crystal display panel according to claim 1, wherein the color filter substrate comprises a transparent substrate, a filter layer, and a black matrix layer; the filter layer comprises a plurality of color filter units and are located on a side of the transparent substrate close to the liquid crystal layer; the black matrix layer is arranged between any two adjacent color filter units; and the plurality of light path openings are located on the black matrix layer.

7. The liquid crystal display panel according to claim 6, wherein the color filter substrate further comprises at least one light-shielding layer, and each light-shielding layer is provided with a plurality of first light-transmitting regions and a plurality of second light-transmitting regions, wherein each of the first light-transmitting regions on each light-shielding layer corresponds to a position of one or more adjacent color filter units, and projections of the one or more adjacent color filter units and the first light-transmitting region corresponding to the one or more adjacent color filter units are at least partially overlapped in the vertical direction, wherein the plurality of second light-transmitting regions on each of the light-shielding layers correspond to positions of the plurality of light path openings in a one-to-one manner, and projections of each of the light path openings, the second light transmitting region corresponding to each of the light path openings, and the top opening of the retaining wall structure corresponding to each of the light path openings are at least partially overlapped in the vertical direction.

8. The liquid crystal display panel according to claim 6, wherein the color filter substrate further comprises a plurality of optical micro-lenses, the plurality of optical micro-lenses are located on a side of the transparent substrate close to the black matrix layer, and positions of the plurality of optical micro-lenses correspond to positions of the plurality of light path openings in a one-to-one manner.

9. The liquid crystal display panel according to claim 8, wherein at least one planarization layer is filled between the plurality of optical micro-lenses and the liquid crystal layer, and a refractive index of the planarization layer and a refractive index of the optical micro-lenses are not equal.

10. The liquid crystal display panel according to claim 8, wherein light-shielding layers are provided between the optical micro-lenses and the liquid crystal layer, and each of the light-shielding layers is provided with a plurality of first light-transmitting regions and a plurality of second light-transmitting regions, wherein each of the first light transmitting regions on each of the light-shielding layers corresponds to a position of one or more adjacent color filter units, and projections of the one or more adjacent color filter units and the first light-transmitting region corresponding to the one or more adjacent color filter units are at least partially overlapped in the vertical direction, wherein the plurality of second light-transmitting regions on each of the light-shielding layers correspond to positions of the plurality of light path openings in a one-to-one manner, and projections of each of the light path openings, the second light transmitting region corresponding to each of the light path openings, the optical micro-lenses corresponding to each of the light path openings, and the top opening of the retaining wall structure corresponding to each of the light path openings are at least partially overlapped in the vertical direction.

\* \* \* \* \*